Patented Nov. 9, 1948

2,453,110

UNITED STATES PATENT OFFICE 2,453,110

ISOMERIZATION OF BICYCLIC SUBSTANCES AND PRODUCTS RESULTING THEREFROM

Joseph P. Bain and Albert H. Best, Jacksonville, Fla., assignors, by mesne assignments, to The Glidden Company, Cleveland, Ohio, a corporation of Ohio No Drawing. Application March 9, 1944, Serial No. 525,762

3 Claims. (Cl. 260—632)

The present invention relates to a new alcohol, esters and ethers thereof and to the method of making the same. More particularly the alcohol is an acyclic alcohol having the empirical formula $C_{11}H_{18}O$.

United States Patent No. 2,340,294 discloses an alcohol formed by reacting B-pinene with anhydrous formaldehyde to produce an alcohol having the empirical formula $C_{11}H_{18}O$, which is an unsaturated bicyclic primary alcohol. Since this alcohol is made from B-pinene or nopinene it is called nopol. Nopol is believed to possess the following structure:

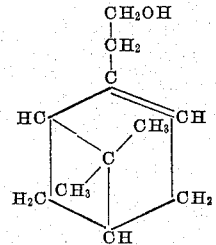

It has been found that if nopol is subjected to a vapor phase pyrolysis that isomerization takes place to yield an isomeric acrylic alcohol, together with other isomeric alcohols.

Nopol was pyrolyzed in the vapor phase by passing the nopol vapor, either diluted with inert gas or the pure vapor, through a heated tube at temperatures of 350 to 450° C. The resulting pyrolysate was condensed and fractionated. Only traces of hydrocarbons were present, indicating that no appreciable dehydration took place. Some differences in the products are noted but in general a series of alcohols are obtained boiling between 105° C. and about 130° C. After stripping off these alcohols there is obtained an aliphatic alcohol containing three double bonds, and having the following physical properties —B. P. at 10 mm.=132–134° C.; $D^{25}$=.9066; $N_D^{25}$ 1.5571 and the rotation is 0.00. The molecular refraction found from the above data is 59.04. The value calculated from the atomic factors is 53.12, or the exaltation is 5.92. The exaltation calculated for allo-ocimene is about 6.32. Therefore, since the exaltations of the two compounds are almost identical the compounds probably have the same conjugation, or the alcohol derived from pyrolysis of nopol is an allo-ocimene type alcohol. The presence of a system of three conjugated double bonds is also indicated by the very high refractive index and the comparatively low density indicates an acyclic structure. The observed absence of optical rotation is also accounted for by the allo-ocimene structure.

The alcohols boiling between 105° C. and 130° C. comprise a series of isomeric alcohols whose exact constitution is unknown, which can be fractionated into a series of cuts, one of which corresponds to a mixture of the 4-isopropylcyclohexadiene ethanols. These isomeric alcohols are useful as resin plasticizers and as starting materials for the preparation of other useful products.

In general compounds of the structural formula

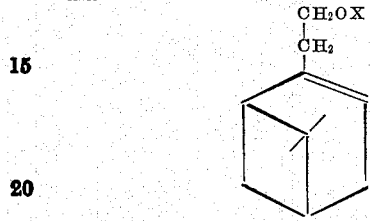

where X may be hydrogen, an

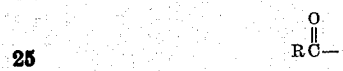

group or R, where R is a hydrocarbon group, may be pyrolyzed to yield the corresponding alcohol pyrolysis products and esters and ethers thereof. Alternatively the esters and ethers may be made from the aliphatic alcohol, or the esters of the aliphatic alcohol may be saponified to form the alcohol.

Having described the invention, what is claimed is:

1. An unsaturated acyclic primary alcohol of the empirical formula $C_{11}H_{18}O$ and having the conjugated triene structure of allo-ocimene, approximately the same exaltation, and the following approximate physical characteristics:

B. P. (10 mm.) _____°C__132–134
$D^{25}$ _____.9066
$N_D^{25}$ _____ 1.5571

2. The process which comprises subjecting the dicyclic primary alcohol of empirical formula $C_{11}H_{18}O$ formed by the condensation of nopinene with anhydrous formaldehyde to pyrolysis in the vapor phase at temperatures between about 350° C. and 450° C., thereby to produce an unsaturated acyclic primary alcohol fraction having the conjugated triene structure of allo-ocimene and having the following approximate physical properties:

B. P. (10 mm.) _____°C__132–134
$D^{25}$ _____.9066
$N_D^{25}$ _____ 1.5571

3. The process which comprises subjecting the unsaturated dicyclic primary alcohol of empirical formula $C_{11}H_{18}O$ formed by the condensation of nopinene with anhydrous formaldehyde to pyrolysis in the vapor phase, and recovering a fraction from the pyrolysate having a boiling point of approximately 132–134° C. at 10 mm. pressure.

JOSEPH P. BAIN.
ALBERT H. BEST.

REFERENCES CITED

The following references are of record in the file of this patent:

UNITED STATES PATENTS

| Number | Name | Date |
|---|---|---|
| 2,340,294 | Bain | Feb. 1, 1944 |
| 2,350,230 | Harvey | May 30, 1944 |

OTHER REFERENCES

Simonsen, "The Terpenes," vol I, page 57 (1931).

Beilstein, "Handbuch der Organischen Chemie," vol. I, pages 463–4; vol I, second supplement, pages 512–3.